US011380962B2

(12) United States Patent
Huusken (10) Patent No.: US 11,380,962 B2
(45) Date of Patent: Jul. 5, 2022

(54) ANTI-SULPHATION PASTING MATS FOR LEAD-ACID BATTERIES

(71) Applicant: Owens Corning Intellectual Capital, LLC, Toledo, OH (US)

(72) Inventor: Robert Huusken, Oldenzaal (NL)

(73) Assignee: Owens Corning Intellectual Capital, LLC, Toledo, OH (US)

(*) Notice: Subject to any disclaimer, the term of this patent is extended or adjusted under 35 U.S.C. 154(b) by 308 days.

(21) Appl. No.: 15/316,235

(22) PCT Filed: Jun. 17, 2015

(86) PCT No.: PCT/US2015/036142
§ 371 (c)(1),
(2) Date: Dec. 5, 2016

(87) PCT Pub. No.: WO2015/195743
PCT Pub. Date: Dec. 23, 2015

(65) Prior Publication Data
US 2017/0207435 A1    Jul. 20, 2017

Related U.S. Application Data

(60) Provisional application No. 62/013,097, filed on Jun. 17, 2014.

(51) Int. Cl.
*H01M 10/14* (2006.01)
*H01M 10/42* (2006.01)
(Continued)

(52) U.S. Cl.
CPC .......... *H01M 50/44* (2021.01); *D04H 1/4218* (2013.01); *D04H 1/587* (2013.01);
(Continued)

(58) Field of Classification Search
CPC ...... H01M 10/06; H01M 10/14; H01M 2/145; H01M 2/1606; H01M 2/1613;
(Continued)

(56) References Cited

U.S. PATENT DOCUMENTS 3,862,861 A * 1/1975 McClelland ........ H01M 2/1613
429/245
4,455,343 A * 6/1984 Temple .................. C03C 25/26
427/212
(Continued)

FOREIGN PATENT DOCUMENTS

CN    1426125 A    6/2003
CN    1790776 A    6/2006
(Continued)

OTHER PUBLICATIONS

International Search Report and Written Opinion from PCT/US15/36142 dated Dec. 3, 2015.
(Continued)

*Primary Examiner* — Sarah A. Slifka
*Assistant Examiner* — Rachel L Zhang
(74) *Attorney, Agent, or Firm* — Calfee, Halter & Griswold LLP (57) ABSTRACT

A non-woven fiber mat for lead-acid batteries is provided. The non-woven fiber mat includes glass fibers coated with a sizing composition, a binder composition, and organic active compounds, wherein the organic active compounds are effective in reducing or preventing sulphation in lead-acid batteries.

29 Claims, 1 Drawing Sheet

(51) Int. Cl.
| | |
|---|---|
| D04H 1/4218 | (2012.01) |
| D06N 3/04 | (2006.01) |
| D04H 1/732 | (2012.01) |
| D06M 13/256 | (2006.01) |
| D06M 15/333 | (2006.01) |
| D06M 11/79 | (2006.01) |
| D06N 3/00 | (2006.01) |
| D04H 1/587 | (2012.01) |
| H01M 50/44 | (2021.01) |
| H01M 50/431 | (2021.01) |
| H01M 50/46 | (2021.01) |
| H01M 50/403 | (2021.01) |
| H01M 10/06 | (2006.01) |
| D06M 101/00 | (2006.01) |

(52) U.S. Cl.
CPC ............ *D04H 1/732* (2013.01); *D06M 11/79* (2013.01); *D06M 13/256* (2013.01); *D06M 15/333* (2013.01); *D06N 3/0011* (2013.01); *D06N 3/0063* (2013.01); *D06N 3/04* (2013.01); *H01M 10/14* (2013.01); *H01M 10/4235* (2013.01); *H01M 50/403* (2021.01); *H01M 50/431* (2021.01); *H01M 50/46* (2021.01); *D06M 2101/00* (2013.01); *D06N 2201/082* (2013.01); *D06N 2203/045* (2013.01); *D10B 2505/00* (2013.01); *H01M 10/06* (2013.01)

(58) Field of Classification Search
CPC ............ H01M 2/1673; H01M 10/4235; D04H 1/4218; D04H 1/587; D04H 1/732
See application file for complete search history.

(56) References Cited

U.S. PATENT DOCUMENTS

| | | | |
|---|---|---|---|
| 5,221,587 A | 6/1993 | Bohnstedt et al. | |
| 5,298,348 A | 3/1994 | Kung | |
| 5,521,587 A | 5/1996 | Sawabe et al. | |
| 5,584,965 A * | 12/1996 | Ogata | B29C 70/50 |
| | | | 156/256 |
| 5,741,588 A * | 4/1998 | Ford | C09J 9/02 |
| | | | 423/447.1 |
| 6,071,641 A | 6/2000 | Zguris | |
| 6,475,676 B1 | 11/2002 | Sawai | |
| 6,746,803 B1 | 6/2004 | Bauer et al. | |
| 7,238,744 B2 | 7/2007 | Yaritz et al. | |
| 7,498,369 B2 | 3/2009 | Whear et al. | |
| 9,190,648 B2 | 11/2015 | Whear et al. | |
| 10,119,025 B2 | 11/2018 | Whear et al. | |
| 2003/0008214 A1 | 1/2003 | Zguris | |
| 2005/0003726 A1 | 1/2005 | Zguris et al. | |
| 2008/0138697 A1 * | 6/2008 | Asada | C03C 14/002 |
| | | | 429/479 |
| 2009/0124151 A1 | 5/2009 | Shoemake | |
| 2010/0004356 A1 * | 1/2010 | Yoshinaga | H01G 11/38 |
| | | | 523/400 |
| 2010/0178825 A1 * | 7/2010 | Shah | D04H 1/4242 |
| | | | 442/188 |
| 2011/0287324 A1 | 11/2011 | Rajaram et al. | |
| 2012/0058698 A1 * | 3/2012 | Lin | D03D 15/267 |
| | | | 442/108 |
| 2012/0070713 A1 * | 3/2012 | Whear | C08L 89/00 |
| | | | 429/143 |
| 2012/0070747 A1 * | 3/2012 | Whear | H01M 10/52 |
| | | | 429/247 |
| 2012/0121975 A1 | 5/2012 | Rajaram et al. | |
| 2012/0244429 A1 * | 9/2012 | Lam | H01M 4/366 |
| | | | 429/211 |
| 2012/0270110 A1 | 10/2012 | Waterhouse et al. | |
| 2013/0071734 A1 | 3/2013 | Wertz et al. | |
| 2014/0038023 A1 | 2/2014 | Guo et al. | |
| 2014/0194020 A1 * | 7/2014 | Vliet | C08L 61/24 |
| | | | 442/180 |
| 2015/0030919 A1 | 1/2015 | Kozawa et al. | |
| 2015/0140404 A1 * | 5/2015 | Yoo | H01M 50/446 |
| | | | 429/145 |
| 2016/0118669 A1 * | 4/2016 | Ito | H01M 8/0239 |
| | | | 429/523 |
| 2016/0268567 A1 * | 9/2016 | Guo | H01M 2/145 |

FOREIGN PATENT DOCUMENTS

| | | |
|---|---|---|
| CN | 1812179 A | 8/2006 |
| CN | 101034738 A | 9/2007 |
| CN | 101222069 A | 7/2008 |
| CN | 101425570 A | 5/2009 |
| CN | 101459259 A | 6/2009 |
| CN | 101702427 A | 5/2010 |
| CN | 101719564 A | 6/2010 |
| CN | 101851309 A | 10/2010 |
| CN | 202167556 U | 3/2012 |
| CN | 102898573 A | 1/2013 |
| CN | 103000830 A | 3/2013 |
| CN | 103545470 A | 1/2014 |
| EP | 54086 | 6/1982 |
| EP | 96371 | 12/1983 |
| EP | 507090 | 10/1992 |
| EP | 2401782 | 9/2010 |
| EP | 2437343 | 4/2012 |
| JP | S59-003867 A | 1/1984 |
| JP | 60205963 A | 10/1985 |
| JP | 64006379 A | 1/1989 |
| JP | 2001313064 A | 11/2001 |
| JP | 2005108538 A | 4/2005 |
| JP | 2013542558 | 11/2013 |
| WO | 2006019684 A2 | 2/2006 |
| WO | 2010/098796 | 9/2010 |
| WO | 2011/059981 | 5/2011 |
| WO | 2011/133677 | 10/2011 |
| WO | 2012040409 A1 | 3/2012 |
| WO | 2012040436 A1 | 3/2012 |

OTHER PUBLICATIONS

International Search Report and Written Opinion from PCT/US15/036141 dated Oct. 8, 2015.
Office Action from Russian Patent Application No. 2017101144 dated Oct. 24, 2018.
Office Action from European Patent Application No. 15745271.5 dated Oct. 5, 2018.
Office Action from Russian Patent Application No. 2017101146 dated Oct. 24, 2018.
Office Action from Japanese Patent Application No. 2016-573056 dated Jun. 13, 2019.
Office Action from Japanese Patent Application No. 2016-573074 dated Jun. 13, 2019.
Office Action from Chinese Patent Application No. 201580032331.6 dated Dec. 11, 2018.
Office Action from Chinese Patent Application No. 201580032325.0 dated Dec. 17, 2018.
Office Action from European Patent Application No. 15734756.8 dated Mar. 13, 2019.
Office Action from European Patent Application No. 15745271.5 dated Feb. 6, 2020.
Office Action from Malaysian Patent Application No. PI 2016704665 dated Feb. 27, 2020.
Office Action from U.S. Appl. No. 15/316,238 dated Jul. 30, 2019.
Office Action from Chinese Patent Application No. 201580032331.6 dated Jul. 8, 2019.
Office Action from Chinese Patent Application No. 201580032325.0 dated Aug. 5, 2019.
Office Action from U.S. Appl. No. 15/316,238 dated Dec. 17, 2019.
Office Action from Brazilian Patent Application No. BR112016029519-6 dated Jan. 14, 2020.

(56) References Cited

OTHER PUBLICATIONS

Office Action from Chinese Patent Application No. 201580032331.6 dated Nov. 22, 2019.
Office Action from Chinese Patent Application No. 201580032325.0 dated Jan. 2, 2020.
Office Action from Japanese Patent Application No. 2016-573074 dated Jun. 11, 2020.
Office Action from Japanese Patent Application No. 2016-573056 dated Jun. 3, 2020.
Office Action from Brazilian Patent Application No. BR112016029242-1 dated Apr. 21, 2020.
Office Action from Chinese Patent Application No. 201580032331.6 dated Apr. 10, 2020.
Office Action from Chinese Patent Application No. 201580032325.0 dated May 11, 2020.
Office Action from U.S. Appl. No. 15/316,238 dated Apr. 16, 2020.
Office Action from Indian Patent Application No. 201737000954 dated Mar. 18, 2020.
Office Action from Malaysian Patent Application No. PI 2016704664 dated Mar. 19, 2020.
Office Action from U.S. Appl. No. 15/316,238 dated Sep. 8, 2020.
Office Action from Chinese Patent Application No. 201580032331.6 dated Jul. 30, 2020.
Board Opinion from Chinese Patent Application No. 201580032325.0 dated Nov. 11, 2020.
Office Action from Indian Patent Application No. 201737001098 dated Aug. 28, 2020.
"Levasil for abrasion & scratch resistance," NOURYON, [online], [retrieved on Aug. 27, 2020], Retrieved from the Internet: <URL: https://colloidalsilica.nouryon.com/functions/abrasion-scratch-resistance/> (Year: 2020).
Office Action from U.S. Appl. No. 15/316,238 dated Jan. 13, 2021.
Office Action from Japanese Patent Application No. 2016-573074 dated Jan. 21, 2021.
Office Action from U.S. Appl. No. 15/316,238 dated May 4, 2021.
Notice of Allowance from U.S. Appl. No. 15/316,238 dated Sep. 9, 2021.
Office Action from Canadian Patent Application No. 2,952,434 dated Jul. 14, 2021.
Office Action from Korean Patent Application No. 10-2017-7000892 dated Feb. 4, 2022.
Office Action from Korean Patent Application No. 10-2017-7000849 dated Feb. 11, 2022.
Office Action from Brazilian Patent Application No. BR112016029519-6 dated Feb. 11, 2022.
Office Action from Canadian Patent Application No. 2,952,434 dated Feb. 25, 2022.

* cited by examiner

ANTI-SULPHATION PASTING MATS FOR LEAD-ACID BATTERIES

RELATED APPLICATIONS

The present application is the U.S. national stage entry of PCT/US15/36142, filed on Jun. 17, 2015, which claims priority to U.S. provisional application no. 62/013,097, filed on Jun. 17, 2014, both of which are hereby incorporated by reference in their entirety.

FIELD

The general inventive concepts relate to lead-acid batteries, and more particularly to non-woven fiber mats for use in lead-acid batteries. The non-woven fiber mats reduce the occurrence of sulphation in lead-acid batteries.

BACKGROUND

Lead-acid batteries are among the most commonly used rechargeable batteries due to their ability to supply high currents, while having a relatively low production cost. Lead-acid batteries are largely used in the automotive starting, lighting, and ignition (SLI) sector and in other industrial sectors due to their high discharge capability. Conventional lead-acid batteries include a positive electrode ($PbO_2$ plate) and a negative electrode (spongy Pb plate) immersed in a sulfuric acid electrolyte. A separator may be disposed between the positive and negative plates. Separators function to not only provide mechanical separation between the positive and negative plates, but to also prevent shorting between electrodes and allow ionic conduction. There are many different forms of electrodes. In some instances, the electrodes consist of lead or lead alloy plates having a grid-like structure. An active material paste consisting of lead oxides and sulfuric acid may be used to fill the holes in the grid of the positive plate. The active material paste is porous, thereby allowing the acid to react with the lead inside the plate, which increases the surface area of the electrodes. The paste is dried and the positive and negative electrodes are activated by an electrochemical process.

During discharge, both the positive and negative plates react with the acid electrolyte material causing lead (II) sulfate ($PbSO_4$) to coat the plates. Lead sulfate is a soft material that can be re-converted back into lead and sulfuric acid, provided the discharged battery is reconnected to a battery charger in a timely manner. As current is applied to re-charge a lead-acid battery, the lead sulfate partially reverses back to lead and lead oxide. This partial reversal to their original states "recharges" the positive and negative electrodes.

If a lead-acid battery is left in the discharged state for a prolonged period of time, the lead sulfate will begin to form hard crystals and coat the surface of the electrode plates. Such a period of prolonged lead sulfate exposure may occur, for instance, when a lead-acid battery is deprived of a full charge. Because hard lead sulfate is a non-conductive material, when it coats the electrode plates, it causes a reduction in the area needed for the electro-chemical reactions. Additionally, the large crystals can reduce the battery's active material that is responsible for high capacity and low resistance.

There have been numerous attempts to reduce detrimental sulphation in lead-acid batteries. For example, paper has been applied to the plate to control the active material on the grid. For example, traditionally, a cellulosic paper may be applied to the plates to aid in spreading the active material paste, keep moisture in the plate prior to drying and to keep the paste on the grid prior to assembling the battery. However, due to the interference of the pasting paper with the battery performance, the paper is either discarded prior to assembly of the battery or degrades during use. This often causes a disruption in the operation of the battery by interfering with the chemical reactions and/or clogging the electrodes.

SUMMARY

Various aspects of the general inventive concepts are directed to a non-woven fiber pasting mat for lead-acid batteries. The non-woven fiber pasting mats include a plurality of glass fibers coated with a sizing composition, a binder composition, and one or more organic active compounds. In some exemplary embodiments, the organic active compounds reduce sulphation in lead-acid batteries.

In some exemplary embodiments, the organic active compounds are included in at least one of the sizing composition and the binder composition.

In some exemplary embodiments, the organic active compounds comprise one or more of sulphosuccinate (di-octyl); polyvinylalcohol; colloidal silica; polyacrylamide; phosphonic acid; polyacrylic acid, such as polycarboxylate and anionic polyelectolyte; phosphate ester; polycarboxylic acid, such as acrylic, maleic, lactic, tartaric, etc.; polymeric anionic compounds, such as polyvinylsulphonic acid and poly(meth)acrylic acid; hexamethylenediaminetetrakis; chitin; chitosan; inulin; polyaspartic acid; polysuccinimide; iminodisuccinate; maleic acid/acrylic acid copolymer; maleic acid/acrylamide copolymer; humic acid; calcium salt of polymers from naphtalenenesulphonic acid condensed with formaldehyde; sodium salt of condensed sulfonated naphtalene; perfluoroalkylsulfonic acid; and cellulose.

Various aspects of the general inventive concepts are directed to a lead-acid battery that includes at least one positive electrode and at least one negative electrode immersed within an electrolyte and a non-woven glass fiber pasting mat at least partially covering a surface of at least one of the positive and negative electrode. The non-woven fiber pasting mat includes a plurality of glass fibers coated with a sizing composition, a binder composition, and one or more organic active compounds. In some exemplary embodiments, the organic active compounds reduce formation of lead sulphate on said negative electrode.

In some exemplary embodiments, said organic active compounds are included in at least one of the sizing composition and the binder composition.

Various exemplary embodiments of the general inventive concepts are further directed to a method of forming an anti-sulphation pasting mat for use in a lead-acid battery. The method includes dispersing a plurality of glass fibers into an aqueous slurry, said glass fibers being coated with a sizing composition; depositing the slurry onto a moving screen; applying a binder onto the deposited slurry; and heating the binder-coated slurry, thereby curing the binder and forming a non-woven pasting mat. The pasting mat includes one or more organic active compounds included in at least one of the sizing composition and the binder.

In some exemplary embodiments, the non-woven fiber pasting mat is capable of increasing the life cycle of a lead-acid battery by at least 10% compared to an otherwise comparable battery without the pasting mat.

Additional features and advantages will be set forth in part in the description that follows, and in part may be obvious from the description, or may be learned by practice of the exemplary embodiments disclosed herein. The objects and advantages of the exemplary embodiments disclosed herein will be realized and attained by means of the elements and combinations particularly pointed out in the appended claims. It is to be understood that both the foregoing summary and the following detailed description are exemplary and explanatory only and are not restrictive of the general inventive concepts as disclosed herein or as claimed.

DESCRIPTION OF THE DRAWINGS

Example embodiments of the invention will be apparent from the more particular description of certain example embodiments of the invention provided below and as illustrated in the accompanying drawings.

DETAILED DESCRIPTION

Various exemplary embodiments will now be described more fully, with occasional reference to any accompanying drawings. These exemplary embodiments may, however, be embodied in different forms and should not be construed as limited to the descriptions set forth herein. Rather, these exemplary embodiments are provided so that this disclosure will be thorough and complete, and will convey the general inventive concepts to those skilled in the art.

Unless otherwise defined, all technical and scientific terms used herein have the same meaning as commonly understood by one of ordinary skill in the art to which these exemplary embodiments belong. The terminology used in the description herein is for describing particular exemplary embodiments only and is not intended to be limiting of the exemplary embodiments.

As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, reaction conditions, and so forth used in the specification and claims are to be understood as being modified in all instances by the term "about" Accordingly, unless indicated to the contrary, the numerical parameters set forth in the specification and attached claims are approximations that may vary depending upon the desired properties sought to be obtained by the present exemplary embodiments. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

The general inventive concepts relate to a non-woven fiber mat, such as a pasting mat or a retainer mat, or other batteries. The non-woven fiber mat may comprise a plurality of reinforcement fibers combined in the form of a sheet. In some exemplary embodiments, the reinforcement fibers are made from glass. However, the reinforcement fibers may also include synthetic fibers, or a combination of glass fibers and synthetic fibers. The term synthetic fiber, as used herein, is intended to include any man-made fiber having suitable reinforcing characteristics including fibers made from suitable polymers such as, for example, polyesters, polyolefins, nylons, aramids, poly(phenylene sulfide), and suitable non-glass fibers such as, carbon, silicon carbide (SiC) and boron nitride.

The glass fibers may be formed from any type of glass suitable for a particular application and/or desired product specifications, including conventional glasses. Non-exclusive examples of glass fibers include A-type glass fibers, C-type glass fibers, G-type glass fiber, E-type glass fibers, S-type glass fibers, E-CR-type glass fibers (e.g., Advantex® glass fibers commercially available from Owens Corning), R-type glass fibers, wool glass fibers, biosoluble glass fibers, and combinations thereof, which may be used as the reinforcing fiber. In some exemplary embodiments, the glass fibers are durable in an acidic environment.

The non-woven glass fiber mat may comprise a single mat, or more than one mat, e.g., two, three, four, or five mats, which may be employed in a single lead-acid battery. Each non-woven glass fiber mat may comprise a single layer, or may be composed of more than one layer, e.g., two, three, four, or five layers. In some exemplary embodiments, the non-woven fiber mat comprises a non-woven glass fiber pasting mat. In some exemplary embodiments, the non-woven fiber mat comprises a non-woven glass fiber retainer mat.

In some exemplary embodiments, the glass fibers have a diameter that is at least 0.2 microns, such as from 0.2 to 30 microns. In some exemplary embodiments, the glass fibers have a diameter from about 1 to about 25 microns, or from about 6 to about 23 microns.

Glass fibers may be formed by drawing molten glass into filaments through a bushing or orifice plate and applying a sizing composition to the filaments as they solidify. The sizing composition provides protection to the fibers from interfilament abrasion and promotes compatibility between the glass fibers and the matrix in which the glass fibers are to be used. After the sizing composition is applied, the fibers may be gathered into one or more strands and wound into a package or, alternatively, the fibers may be chopped while wet with the sizing and collected. The collected chopped strands may then be dried to form dry chopped fibers or they can be packaged in their wet condition as wet chopped fibers.

In some exemplary embodiments, the sizing compositions used to coat glass fibers are aqueous-based compositions, such as suspensions or emulsions. The suspension or emulsion has a solids content that may be composed of one or more of a film former, a coupling agent, a lubricant, and a surfactant. A film former may work to hold individual filaments together to form fibers, and protect the filaments from damage caused by abrasion. Acceptable film formers include, for example, polyvinyl acetates, polyurethanes, modified polyolefins, polyesters epoxides, and mixtures thereof. A coupling agent may be included in a sizing composition to enhance the adhesion of the sizing composition with a matrix material when forming a composite, to improve the composite properties. In some exemplary embodiments, the coupling agent is an organofunctional silane.

Additional additives may be included in the sizing compositions, depending on the intended application. Such additives include, for example, anti-statics, wetting agents, anti-oxidants, and pH modifiers.

In accordance with the general inventive concepts, the non-woven glass fiber mat may be produced using either continuous or chopped fibers, or a combination of the continuous and chopped fibers. The chopped fibers or fiber strands have lengths that may vary depending on a particular process and/or application. In some exemplary embodiments, the chopped fibers/strands have a length of about 3 to about 60 mm.

The non-woven glass fiber mats may be formed in accordance with any of the known methods for producing glass fiber mats, such as wet-laid processing and dry-laid processing. In a wet-laid processing, a water slurry (i.e., "whitewater") is provided into which glass fibers are dispersed. The white water may contain dispersants, viscosity modifiers, defoaming agents or other chemical agents. The slurry containing the glass fibers is then deposited onto a moving screen and a substantial amount of the water is removed. A binder may then be applied to the deposited fibers and the resulting mat is dried to remove any remaining water and to cure the binder, framing a non-woven glass fiber mat. In a dry-laid process, fibers are chopped and air blown onto a conveyor and a binder is then applied to form a mat. Dry-laid processes may be particularly suitable for the production of highly porous mats having bundles of glass fibers.

The binder may be any type of binder composition, such as an acrylic binder, a styrene acrylonitrile binder, a styrene butadiene rubber binder, a urea formaldehyde binder, an epoxy binder, a polyurethane binder, a phenolic binder, a polyester binder, or mixtures thereof. Exemplary acrylic binders may include, for example, polyacrylic acid, ethylacrylate, methacrylate, methylmethacrylate, styrene acrylate, or mixtures thereof. In some exemplary embodiments, the binder is a thermoset acrylic binder formed of polyacrylic acid and at least one polyol, such as for example, triethanolamine or glycerine. The binder may optionally contain one or more additives for improving processibility and/or product performance. Non-limiting examples of such additives include dyes, oils, fillers, colorants, UV stabilizers, coupling agents (for example, aminosilanes), lubricants, wetting agents, surfactants, antistatic agents, and combinations thereof.

In some exemplary embodiments, the binder comprises about 1 to about 30 weight percent of the total dry weight of the glass fiber mat. In other exemplary embodiments, the binder comprises about 8 to about 25 weight percent of the total dry weight of the glass fiber mat. In some exemplary embodiments, the binder comprises about 18 to 25 weight percent of the total dry weight of the glass fiber mat.

In some exemplary embodiments, the non-woven glass fiber mats are treated with one or more organic active compounds that are capable of reducing or eliminating sulphation of the electrodes in a lead-acid battery. The organic active compounds may be included as additives to the sizing composition, additives to the binder composition, or as an additive to both the sizing and binder compositions. In some exemplary embodiments, the additives may be added to the surface of the mat, after the mat has been formed.

In some exemplary embodiments, the organic active compounds include active ingredients that directly influence the reactions that take place on the surface of an electrode. In some exemplary embodiments, the organic active compounds include one or more of sulphosuccinate (di-octyl); polyvinylalcohol; colloidal silica; polyacrylamide; phosphonic acid; polyacrylic acid, such as polycarboxylate and anionic polyelectolyte; phosphate ester; polycarboxylic acid, such as acrylic, maleic, lactic, tartaric, etc.; polymeric anionic compounds, such as polyvinylsulphonic acid and poly(meth)acrylic acid; hexamethylenediaminetetrakis; chitin; chitosan; inulin; polyaspartic acid; polysuccinimide; iminodisuccinate; maleic acid/acrylic acid copolymer; maleic acid/acrylamide copolymer; humic acid; calcium salt of polymers from naphtalenenesulphonic acid condensed with formaldehyde; sodium salt of condensed sulfonated naphtalene; perfluoroalkylsulfonic acid; and cellulose. In some exemplary embodiments, the organic active ingredients include one or more of sulphosuccinate (di-octyl) and a polyvinylalcohol/colloidal silica compound.

The organic active compounds are capable of reacting directly with lead sulfate that forms during discharge of a lead-acid battery. Sulphation is primarily an issue on the negative plates, where sulphation deteriorates the negative electrode properties. By reacting with the lead sulfate, the organic active compounds keep the lead sulfate soluble in the sulfuric acid electrolyte, which may at least delay, and in some cases inhibit or otherwise reduce, the formation of lead sulfate crystals. In some exemplary embodiments, the use of organic active compounds as described herein prevents the formation of lead sulfate crystals.

In some exemplary embodiments, the organic active compounds are present in the non-woven mat in an amount from about 0.05 to about 25.0 weight percent of said binder and/or sizing composition containing the organic compounds. In other exemplary embodiments, said organic active compounds are present in an amount from about 0.1 to about 20 weight percent of said binder or sizing composition containing the organic active compounds.

In some exemplary embodiments, the binder itself may act as an anti-sulphation composition. For example, a polyacrylic acid binder may also react directly with the lead sulphate to maintain its solubility in the electrolyte. Accordingly, in some exemplary embodiments, 100% (or substantially all) of the binder will comprise surface active chemistry.

By incorporating the organic active compounds directly into the sizing composition and/or into the binder composition, the organic active compounds are directly exposed to the surface of the electrodes where lead sulphate crystals form. The organic active compounds have a limited solubility in the acid electrolyte and are released slowly during use once the non-woven mat is in the acid electrolyte and the plates become active. Utilizing the non-woven fiber mat as a pasting mat allows for the slow release of the organic active compounds from the pasting mat allows the organic active compounds to achieve direct contact with the surface of the electrodes. The solubility of the organic active compounds in the acid electrolyte may be affected by the temperature, as fairly high temperatures are reached in battery curing and formation. The high temperatures may initiate leaching from the pasting mat to the surface of the negative electrode.

The organic active compounds are prone to oxidation, which is undesirable as oxidation may destroy their anti-sulphation activity and their oxidation products may be harmful for the battery. Oxidation of the organic active compounds mainly takes place at the positive plate because lead dioxide ($PbO_2$) is a very strong oxidizer, especially in combination with sulphuric acid. By applying the organic active compounds to the negative plate via the non-woven pasting mat, the distance to the positive plate is maximized and the organic active compounds have a lower risk of oxidation at the positive plate compared to applications that introduce chemistries directly into the electrolyte.

In some exemplary embodiments, treating the electrode surface with organic active compounds by incorporating one or more organic active compounds into the., sizing composition and/or binder composition of a pasting mat demonstrates an improvement in battery life cycle of at least 10%, or at least about 25% over otherwise similar lead-acid battery cells that either have no pasting mat or include a cellulose base pasting mat.

The process of preparing a lead-acid battery comprises forming one or more battery cells, which each include a positive plate electrode having a first face and a second face, opposite the first face, a negative plate electrode having a first face and a second face, opposite the first face, and a separator disposed therebetween. The positive electrode includes a grid containing lead alloy material. A positive active material, such as lead dioxide, is coated on the grid of the positive electrode. The negative plate electrode also includes a grid of lead alloy material that is coated with a negative active material, such as lead. The positive and negative plate electrodes are immersed in an electrolyte that may include sulfuric acid and water. The separator may be positioned between the positive and negative plate electrodes to physically separate the two electrodes while enabling ionic transport.

The non-woven fiber pasting mat disclosed herein may be positioned to partially or fully cover at least one surface of the negative plate electrode. In some exemplary embodiments, pasting mats are positioned on each side of the negative plate electrode. In some exemplary embodiments, the use of glass fibers in the non-woven pasting mat provides added dimensional stability to the negative plates during charge and discharge. During discharge the negative plates generally increase in volume and then shrink significantly during a charging cycle, due to the different crystals formed. The improved dimensional stability provided by the glass fiber pasting mat reduces this expansion/shrinkage, which in turn leads to an improved battery life by preventing active mass from shedding from the grid and maintaining good contact between the active material and the grid to ensure charge acceptance and current flow. In some exemplary embodiments, a non-woven fiber pasting mat is positioned to partially or fully cover at least one surface of the positive plate, to function as a retainer by holding the active material in place on the positive plate while also providing improved dimensional stability. In some exemplary embodiments, pasting mats are positioned on each side of the positive plate electrode. In some exemplary embodiments, non-woven fiber pasting mats are positioned on both sides of each of the positive and negative plates.

In other exemplary embodiments, the non-woven fiber mat functions as a retainer mat and is positioned in contact with at least one side of the separator.

The following examples are meant to better illustrate the present invention but are not intended to limit the general inventive concepts in any way.

EXAMPLE

Example 1

A variety of 20 hour rate 2 Volt battery cells were assembled and the negative plates were joined with non-woven glass fiber pasting mats having different binder and/or fiber compositions. The cells were then subjected to partial state of charge cycling tests and afterwards submitted to teardown analysis. The presence of crystallized lead sulfate was determined on the top and the bottom of the plate with wet analysis and x-ray diffraction.

A) Partial State of Charge (PSoC) Testing Method:

The partial state of charge cycle testing procedure repeats a partial discharge and charge to an amount of capacity around various levels of the average state of charge. An equalization step in the PSoC test method was omitted to increase the partial state of charge residence time and to increase the test speed. The battery cells were subjected to cycling at 17.5% Depth of Discharge (DoD) at 27° C. with an initial point of cycling at 50% State of Charge (SoC). The cycling conditions included preconditioning by discharge for 2.5 hours at $4 \times 1_{20}A$ (4A), reaching the initial point of cycling at 50% SoC. The batteries were then charged for 40 minutes at $I_{max}=7A$ ($7 \times I_{20}A$) and $U_{max}=2.4V/Cell$. The batteries were then discharged for 30 minutes at 7A ($7 \times I_{20}A$). The consecutive charge and discharge constituted one cycle. The higher number of cycles indicates a longer battery life time. After reaching the switch-off criteria ($U_{cell} \leq 1.666V$), the cycling ended and the cell was charged and submitted to a detailed tear down analysis.

B) Tear-Down Analysis:

To perform the tear down analysis, the negative plate was divided into three sections: top, middle, and bottom. The active material from the top and bottom of the plate was separately selected at different places and grinded to homogenize the sample.

The same homogenized sample of top and bottom negative plate active material was used to record an X-ray diffraction pattern. The device used to record the X-ray diffraction pattern was a Philips 2134, ADP-15.

The active material on the top and bottom sections was further analyzed for $PbSO_4$ and Pb content from the final recharge. The $PbSO_4$ weight percent is considered irreversible lead sulphate, indicative of sulphation. Additionally, if the battery has suffered from sulphation, the $PbSO_4$ would be concentrated on the bottom of the plate.

TABLE 1

| | | | Battery Sulphation | | |
| --- | --- | --- | --- | --- | --- |
| Sample | Organic active chemistry | # of cycles at PSoC cycling | $PbSO_4$ located at top of negative plate after final recharge. (wt. %) | $PbSO_4$ located at bottom of negative plate after final recharge. (wt. %) | Comments |
| Comp. Sample 1 | None | 271 | 11% | 65% | Commercially available glass pasting mat |

TABLE 1-continued

| | | | Battery Sulphation | | |
|---|---|---|---|---|---|
| Sample | Organic active chemistry | # of cycles at PSoC cycling | $PbSO_4$ located at top of negative plate after final recharge. (wt. %) | $PbSO_4$ located at bottom of negative plate after final recharge. (wt. %) | Comments |
| Comp. Sample 2 | None | 410 | 21% | 57% | (acrylic bound glass tissue), strong sulphation Conductive carbon fiber added, strong sulphation |
| Sample 3 | Sulphosuccinate (di-octyl) | 874 | 5% | 18% | Low sulphation |
| Sample 4 | Polyvinylalcohol/ colloidal silica | 579 | 9% | 11% | Low sulphation |

As illustrated in Table 1, comparative samples 1 and 2, which included conventional pasting mats without organic active compounds, demonstrated significant sulphation at the bottom of the negative plate. Comparatively, Examples 3 and 4, including organic active compounds, demonstrated significantly lower sulphation of less than 10% and also increased partial state of charge cycling to greater than 500 cycles, which is indicative of a higher battery life.

Specifically, Sample 3 included a 25 g/m² pasting mat comprising a mixture of 6.5 μm-6 mm and 11 μm-13 mm chopped glass fibers. The mat was bonded with a self-crosslinkable acrylic based binder. The mat had a binder content of about 20%. A di-octylsuphosuccinate surfactant was added to the binder in about 0.2 weight percent based on dry binder solids. Example 4 included a 45 g/m² pasting mat comprising a base tissue formed of a 50/50 mixture of 6.5 μm-6 mm glass fibers and 11 μm-6 mm glass fibers and included about 16 weight percent of a polyvinylalcohol binder. The base sheet was treated with a mixture of self cross-linkable acrylate and colloidal silica. The final mat included about 3 g/m² polyvinylalcohol and 22 g/m² colloidal silica.

Example 2

A variety of non-woven fiber pasting mats were prepared to have various fiber types, weights, and thicknesses. Table 2 below illustrates the properties of the mats.

TABLE 2

| | | Properties of Fiber Mats | | | | | |
|---|---|---|---|---|---|---|---|
| Sample | Fiber type | Weight (grams/m²) | Thickness (mm) | Air permeability (l/m²s) | LOI measured (%) | Electrical Resistance | ER/0.1 mm |
| 1 | glass | 25.1 | 0.19 | 7420 | 12.0 | 11.7 | 6.17 |
| 2 | glass | 22.9 | 0.205 | 6780 | 21.1 | 13.7 | 6.66 |
| 3 | glass | 24.6 | 0.22 | 8330 | 16.5 | 16.3 | 7.43 |
| 4 | glass | 24.2 | 0.165 | 5190 | 18.9 | 14.1 | 8.53 |
| 5 | glass | 131.5 | 0.9 | 2400 | 14.1 | 37.8 | 4.20 |
| 6 | glass | 105.3 | 0.95 | 4420 | 15.7 | 27.1 | 2.85 |
| 7 | glass | 117.3 | 0.84 | 2400 | 14.7 | 36.7 | 4.36 |
| 8 | glass | 23.8 | 0.19 | 6930 | 23.0 | 13.8 | 7.24 |
| 9 | glass | 23.5 | 0.2 | 7650 | 11.9 | 12.0 | 6.02 |
| 10 | glass | 84.5 | 0.61 | 3130 | 15.9 | 26.0 | 4.26 |
| 11 | glass | 53.8 | 0.42 | 4020 | 17.8 | 30.1 | 7.16 |
| 12 | glass | 39.7 | 0.33 | 5130 | 18.9 | 23.1 | 7.01 |
| 12 | glass | 69.1 | 0.38 | 1790 | 18.2 | 26.0 | 6.85 |
| 13 | glass | 48.2 | 0.42 | 4246 | 11.6 | 19.6 | 4.66 |
| 14 | glass | 41.8 | 0.4 | 4488 | 18.8 | 15.4 | 3.84 |
| 15 | glass | 47.5 | 0.42 | 4114 | 27.9 | 24.3 | 5.78 |
| 16 | glass | 51 | 0.42 | 3982 | 33.5 | 46.2 | 11.01 |
| 17 | glass | 40.3 | 0.41 | 5104 | 16.9 | 14.2 | 3.46 |
| 18 | glass | 43.7 | 0.41 | 4378 | 19.4 | 14.0 | 3.41 |
| 19 | glass | 43.6 | 0.41 | 3740 | 20.1 | 22.0 | 5.37 |
| 20 | glass | 50.1 | 0.41 | 1606 | 19.8 | 21.8 | 5.33 |
| 21 | glass | 39.6 | 0.4 | 5786 | 15.4 | 7.7 | 1.94 |
| Comparative Example-1 | polyester | 25 | 0.06 | 1570 | 100.0 | 26.9 | 44.77 |
| Comparative Example-2 | polyester | 18.5 | 0.08 | 2850 | 100.0 | 19.7 | 24.59 |
| Comparative Example -3 | glass | 19.5 | 0.17 | 5540 | 38.0 | 26.1 | 15.37 |

Figure 1:
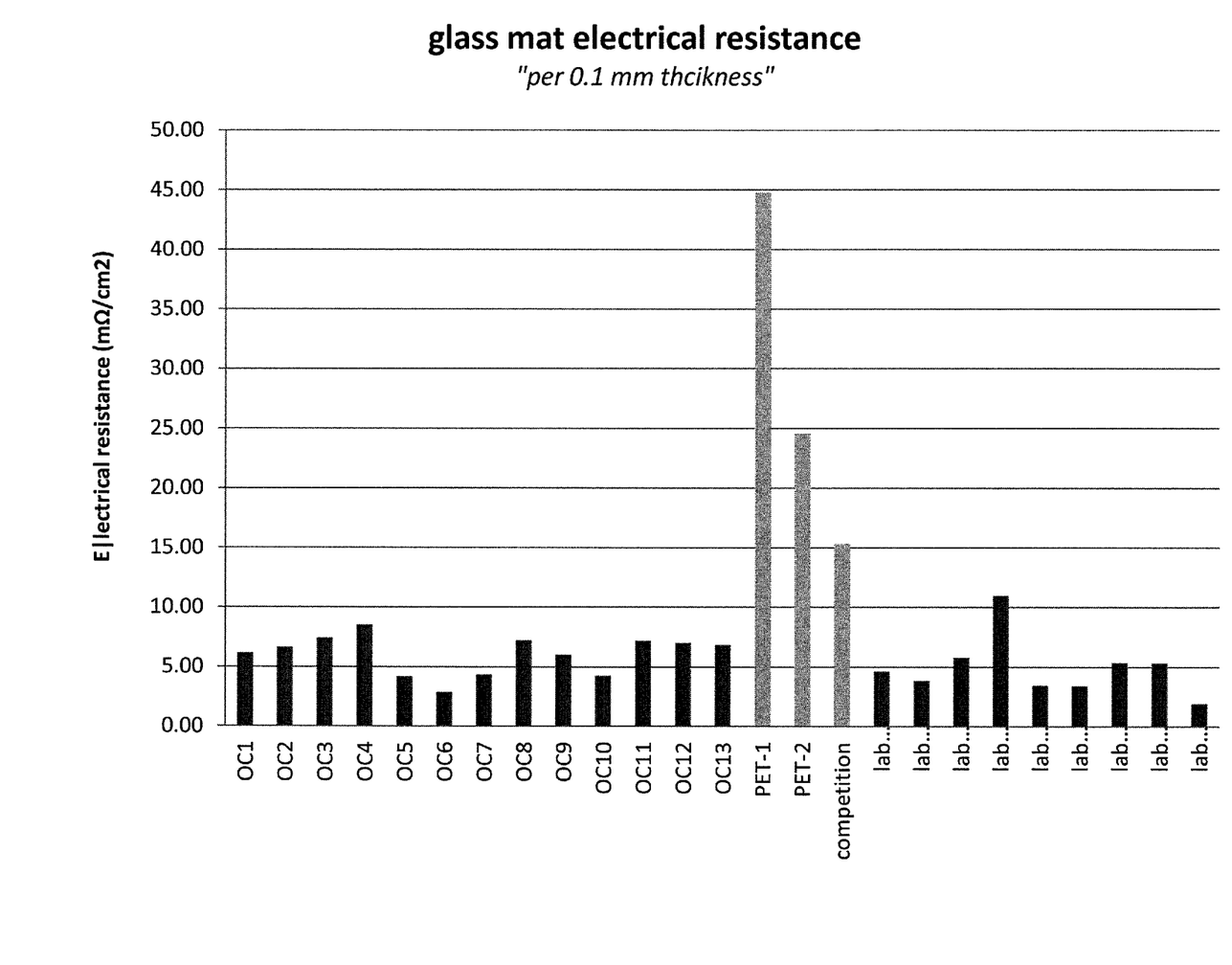
FIG. 1 graphically illustrates the electrical resistance normalized over 0.10 mm thickness for exemplary non-woven fiber mats prepared in accordance with the present invention.

As illustrated in Table 2, the electrical resistance for the non-woven fiber mats was lowest for glass fiber mats prepared in accordance with the present invention. The electrical resistance, when normalized over 0.10 mm thickness, is lowest for the non-woven glass fiber mats prepared in accordance with the present invention. Each of samples 1-21 demonstrates electrical resistance, normalized over 0.1 mm, of lower than 15/0.1 mm. In some exemplary embodiments, the glass fibers may have an electrical resistance of less than 10/0.1 mm. The normalized electrical resistances of the examples illustrated in Table 2 are further compared in FIG. 1, which shows that each of the non-woven glass fiber mats formed according to the present invention (OC1-13 and lab examples) demonstrates an electrical resistance normalized over 0.1 mm that is far less than 15.

Although the general inventive concepts have been set forth in what is believed to be exemplary illustrative embodiments, a wide variety of alternatives would be known or otherwise apparent to those of skill in the art and, thus, are encompassed by the general inventive concepts. The general inventive concepts are not otherwise limited, except for the recitation of the claims set forth below.

The invention claimed is:

1. A non-woven fiber pasting mat comprising:
a plurality of fibers coated with a sizing composition, wherein the sizing composition comprises a film former selected from a group consisting of polyvinyl acetates, polyurethanes, modified polyolefins, polyesters epoxides, and mixtures thereof; and
a binder composition comprising one or more organic active compounds, said organic active compounds comprising one or more of sulphosuccinate (di-octyl); polyvinylalcohol; colloidal silica; polyacrylamide; phosphonic acid; polyacrylic acid;
phosphate ester; polycarboxylic acid; polymeric anionic compounds;
hexamethylenediaminetetrakis; chitin; chitosan; inulin; polyaspartic acid;
polysuccinimide; iminodisuccinate; maleic acid/acrylic acid copolymer; maleic acid/acrylamide copolymer; humic acid; calcium salt of polymers from naphtalene-nesulphonic acid condensed with formaldehyde; sodium salt of condensed sulfonated naphtalene; perfluoroalkylsulfonic acid; and cellulose,
wherein the binder composition holds the fibers together to form a non-woven mat,
wherein said organic active compounds are present in the binder composition in an amount from about 0.05 to about 25.0 wt. % of said binder composition, and
wherein said organic active compounds are operable to reduce sulphation in a lead-acid battery.

2. The non-woven fiber pasting mat of claim 1, wherein said binder composition is selected from the group consisting of an acrylic binder, a styrene acrylonitrile binder, a styrene butadiene rubber binder, an epoxy binder, a polyurethane binder, a phenolic binder, a polyester binder, and mixtures thereof.

3. The non-woven fiber pasting mat of claim 1, wherein said binder composition is an acid resistant binder.

4. The non-woven fiber pasting mat of claim 1, wherein said fibers comprise one or more of glass fibers, polyester fibers, polyolefin fibers, nylon fibers, aramid fibers, poly(phenylene sulfide) fibers, carbon fibers, silicon carbide (SiC) fibers, boron nitride fibers.

5. The non-woven fiber pasting mat of claim 1, wherein said fibers comprise glass fibers.

6. The non-woven fiber pasting mat of claim 5, wherein said fibers have an average diameter of about 1 micron to about 25 microns.

7. The non-woven fiber pasting mat of claim 1, wherein said fibers have an average diameter of about 0.2 microns to about 30 microns.

8. The non-woven fiber pasting mat of claim 1, wherein said fibers are chopped fibers having an average length of between about 3 mm and about 60 mm.

9. The non-woven fiber pasting mat of claim 1, wherein said organic active compounds comprise one or more of a sulphosuccinate (di-octyl) and a polyvinylalcohol/colloidal silica compound.

10. The non-woven fiber pasting mat of claim 1, wherein said non-woven fiber pasting mat is operable to increase the life cycle of a lead-acid battery by at least 10% compared to an otherwise comparable battery without said pasting mat.

11. The non-woven fiber pasting mat of claim 1, wherein said non-woven fiber pasting mat has an electrical resistance of less than about 15 m$\Omega$/cm$^2$ per 0.1 mm thickness of the mat.

12. The non-woven fiber pasting mat of claim 1, wherein said non-woven fiber pasting mat has an electrical resistance of less than 10 m$\Omega$/cm$^2$ per 0.1 thickness of the mat.

13. A lead-acid battery comprising:
a positive electrode having a first face and a second face opposite said first face and a negative electrode having a first face and a second face opposite said first face, wherein each of said positive and negative electrode is immersed within an electrolyte;
a non-woven fiber pasting mat at least partially covering a surface of at least one of said first and second faces of at least one of said positive and said negative electrode, said non-woven fiber pasting mat comprising:
a plurality of fibers coated with a sizing composition, wherein the sizing composition comprises a film former selected from a group consisting of polyvinyl acetates, polyurethanes, modified polyolefins, polyesters epoxides, and mixtures thereof; and
a binder composition comprising one or more organic active compounds, said organic active compounds comprising one or more of sulphosuccinate (di-octyl); polyvinylalcohol; colloidal silica; polyacrylamide; phosphonic acid; polyacrylic acid;
phosphate ester; polycarboxylic acid; polymeric anionic compounds;
hexamethylenediaminetetrakis; chitin; chitosan; inulin; polyaspartic acid;
polysuccinimide; iminodisuccinate; maleic acid/acrylic acid copolymer; maleic acid/acrylamide copolymer; humic acid; calcium salt of polymers from naphtalene-nesulphonic acid condensed with formaldehyde; sodium salt of condensed sulfonated naphtalene; perfluoroalkylsulfonic acid; and cellulose,
wherein the binder composition holds the fibers together to form a non-woven mat, and
wherein said organic active compounds are present in the binder composition in an amount from about 0.05 to about 25.0 wt. % of said binder composition, and
wherein said organic active compounds reduce formation of lead sulphate on said negative electrode.

14. The lead-acid battery of claim 13, wherein said fibers comprise one or more of glass fibers, polyester fibers, polyolefin fibers, nylon fibers, aramid fibers, poly(phenylene sulfide) fibers, carbon fibers, silicon carbide (SiC) fibers, boron nitride fibers.

15. The lead-acid battery of claim 13, wherein said fibers have an average diameter of about 0.2 microns to about 30 microns.

16. The lead-acid battery of claim 15, wherein said fibers have an average diameter of about 1 micron to about 25 microns.

17. The lead-acid battery of claim 13, wherein said fibers are chopped fibers having an average length of between about 3 mm and about 60 mm.

18. The lead-acid battery of claim 13, wherein said organic active compounds comprise one or more of a sulphosuccinate (di-octyl) and a polyvinylalcohol/colloidal silica compound.

19. The lead-acid battery of claim 13, wherein said non-woven fiber pasting mat has an electrical resistance of less than about 15 m$\Omega$/cm$^2$ per 0.1 mm thickness of the mat.

20. The lead-acid battery of claim 13, wherein a fiber pasting mat is at least partially covering each of said first and second faces of said positive electrode.

21. The lead-acid battery of claim 13, wherein a fiber pasting mat is at least partially covering each of said first and second faces of said negative electrode.

22. A method of forming a non-woven fiber mat for use in a lead-acid battery, said method comprising:
dispersing a plurality of fibers into an aqueous slurry, said fibers being coated with a sizing composition, wherein the sizing composition comprises a film former selected from a group consisting of polyvinyl acetates, polyurethanes, modified polyolefins, polyesters epoxides, and mixtures thereof;
depositing said slurry onto a screen;
applying a binder onto the deposited slurry; and
heating said binder-coated slurry, thereby curing said binder coated slurry and forming a non-woven fiber mat, wherein said fiber mat includes one or more organic active compounds included in said binder in an amount from about 0.05 to about 25.0 wt. % of said binder, said organic active compounds comprising one or more of sulphosuccinate (di-octyl); polyvinylalcohol; colloidal silica; polyacrylamide; phosphonic acid; polyacrylic acid; phosphate ester; polycarboxylic acid; polymeric anionic compounds; hexamethylenediaminetetrakis; chitin; chitosan; inulin; polyaspartic acid;
polysuccinimide; iminodisuccinate; maleic acid/acrylic acid copolymer; maleic acid/acrylamide copolymer; humic acid; calcium salt of polymers from naphtalenenesulphonic acid condensed with formaldehyde; sodium salt of condensed sulfonated naphtalene; perfluoroalkylsulfonic acid; and cellulose.

23. The method of claim 22, wherein said organic active compounds comprise one or more of a sulphosuccinate (di-octyl) and a polyvinylalcohol/colloidal silica compound.

24. A non-woven retainer mat for contacting a separator in a lead-acid battery comprising:
a plurality of fibers coated with a sizing composition, wherein the sizing composition comprises a film former selected from a group consisting of polyvinyl acetates, polyurethanes, modified polyolefins, polyesters epoxides, and mixtures thereof; and
a binder composition comprising one or more organic active compounds, said organic active compounds comprising one or more of sulphosuccinate (di-octyl); polyvinylalcohol; colloidal silica; polyacrylamide; phosphonic acid; polyacrylic acid;
phosphate ester; polycarboxylic acid; polymeric anionic compounds;
hexamethylenediaminetetrakis; chitin; chitosan; inulin; polyaspartic acid;
polysuccinimide; iminodisuccinate; maleic acid/acrylic acid copolymer; maleic acid/acrylamide copolymer; humic acid; calcium salt of polymers from naphtalenenesulphonic acid condensed with formaldehyde; sodium salt of condensed sulfonated naphtalene; perfluoroalkylsulfonic acid; and cellulose,
wherein the binder composition holds the fibers together to form a non-woven mat, and
wherein said organic active compounds are present in the binder composition in an amount from about 0.05 to about 25.0 wt. % of said binder composition, and
wherein said organic active compounds are operable to reduce sulphation in a lead-acid battery.

25. The non-woven retainer mat of claim 24, wherein said organic active compounds comprise about 0.1 weight percent to about 20 weight percent of said binder.

26. The non-woven retainer mat of claim 24, wherein said non-woven retainer mat is capable of increasing the life cycle of a lead-acid battery by at least 10% compared to an otherwise comparable led-acid battery without said non-woven retainer mat.

27. A lead-acid battery comprising:
a positive electrode, a negative electrode, and a separator, having a first face and a second face opposite thereto, disposed therebetween, wherein each of said positive electrode, negative electrode, and separator is immersed within an electrolyte; and
a non-woven retainer mat according to claim 24.

28. The lead-acid battery of claim 27, wherein said organic active compounds comprise one or more of a sulphosuccinate (di-octyl) and a polyvinylalcohol/colloidal silica compound.

29. The non-woven retainer mat for contacting a separator in a lead-acid battery of claim 24, wherein said organic active compounds comprise one or more of a sulphosuccinate (di-octyl) and a polyvinylalcohol/colloidal silica compound.

* * * * *